United States Patent
Biggs et al.

(10) Patent No.: US 7,513,410 B2
(45) Date of Patent: Apr. 7, 2009

(54) AIR BEARING GAP CONTROL FOR INJECTION MOLDED SOLDER HEADS

(75) Inventors: Glen N. Biggs, Wappingers Falls, NY (US); Timothy J. Chainer, Putnam Valley, NY (US); John P. Karidis, Ossining, NY (US); Dennis G. Manzer, Bedford Hills, NY (US); Christopher L. Tessler, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 11/760,813

(22) Filed: Jun. 11, 2007

(65) Prior Publication Data

US 2008/0302860 A1 Dec. 11, 2008

(51) Int. Cl.
*B23K 31/02* (2006.01)
*B22D 35/00* (2006.01)

(52) U.S. Cl. .......................... 228/256; 228/33; 222/592

(58) Field of Classification Search ........................ None
See application file for complete search history.

(56) References Cited

U.S. PATENT DOCUMENTS

| | | | |
|---|---|---|---|
| 6,139,636 A * | 10/2000 | Huang et al. | 118/320 |
| 6,387,184 B1 * | 5/2002 | Gibson et al. | 118/323 |
| 6,527,158 B1 * | 3/2003 | Brouillette et al. | 228/33 |
| 6,708,873 B2 * | 3/2004 | Gruber et al. | 228/256 |
| 6,869,484 B2 * | 3/2005 | Hunt et al. | 118/718 |

(Continued)

OTHER PUBLICATIONS

K. Puttlitz, et al., "Area Array Interconnection Handbook—13 Reliability of Die-Level Interconnection", Kluwer Academic Publishers; pp. 506-520.

(Continued)

*Primary Examiner*—Kiley Stoner
(74) *Attorney, Agent, or Firm*—Scully, Scott, Murphy & Presser, P.C.; Lisa M. Yamonaco

(57) ABSTRACT

An air bearing gap control arrangement for injection molded solder filler heads. Also provided is a method of providing for a gap control for injection molded solder filler heads utilizing an air bearing arrangement. Provided is a C-ring seal, at the lower or dispensing region of the solder filler head structure, wherein the C-shape is open at the leading edge thereof. Hereby, a prevalent leading edge gap is tightly controlled by means of pressurized air in order to form an air bearing. Downstream of this leading edge is the molten solder, which is contained within a very narrow gap height between the solder filler head and the mold. As the solder fills the pits or recesses which are formed in the mold surface, air will rush out or be displaced from the pits towards the air bearing and is then expelled, while the deposited solder remains in place.

14 Claims, 1 Drawing Sheet

U.S. PATENT DOCUMENTS

| | | | |
|---|---|---|---|
| 7,316,338 B2 * | 1/2008 | Botham et al. | 222/606 |
| 2002/0053591 A1 * | 5/2002 | Razon et al. | 228/258 |
| 2005/0109823 A1 * | 5/2005 | Gruber et al. | 228/246 |
| 2005/0263571 A1 * | 12/2005 | Belanger et al. | 228/256 |
| 2006/0060259 A1 * | 3/2006 | Devitt | 141/65 |
| 2007/0246518 A1 * | 10/2007 | Cordes et al. | 228/256 |
| 2008/0048008 A1 * | 2/2008 | Schultz | 228/180.22 |
| 2008/0280453 A1 * | 11/2008 | Koelmel et al. | 438/758 |

OTHER PUBLICATIONS

Katsuaki Suganuma, "Lead-Free Soldering in Electronics". Science, Technology, and Environmental Impact—Mechanical Evaluation in Electronics; pp. 189-192.

H. Wang, et al., "Vibration Fatigue Experiments of SMT Solder Joint," "Microelectronics Reliability, 44 (2004), pp. 1143-1156; and.

R. Darveaux, et al., "Reliability of Area Array Solder Joints in Bending", Amkor Technology, Inc.; (12 Pages).

* cited by examiner

AIR BEARING GAP CONTROL FOR INJECTION MOLDED SOLDER HEADS

BACKGROUND OF THE INVENTION

1. Field of the Invention

The present invention relates to an air bearing gap control for injection molded solder filler heads. Moreover, the invention also relates to a method of providing for a gap control for injection molded solder filler heads utilizing an air bearing arrangement.

2. Discussion of the Prior Art

In the present state-of-the-technology, problems which are encountered in the injection molding or extruding of hot solder into a mold through the well-known injection molded solder (IMS) process, can be traced back to the escape of air from the mold while the flow of hot solder is concurrently being extruded from the filler head into the mold. At this time, in an effort at solving this particular problem, which is frequently encountered in the injection molding of hot solder, there is implemented the formation of small gaps in the leading edge of an organic O-ring seal of the filler head in order to enable air to escape from recesses or pits in the mold while concurrently retaining the solder filled therein during the pouring process of the solder into the mold.

A typical injection molded solder filler head, which includes the organic O-ring seal which holds the solder in is also adapted to scrape the solder flat by a trailing edge of the filler head as it is displaced relative to the mold, or the mold moves relative thereto. In that connection, the leading edge of the O-ring of the solder filler head is either porous, or is rendered porous by the forming of sanding grooves therein, or through cutting grooves into the leading edge by means of a laser.

SUMMARY OF THE INVENTION

Accordingly, in order to improve upon the present state-of-the-technology, to provide a novel gap control, the present invention proposes the utilization of a C-ring seal, at the lower or dispensing region of the solder filler head structure, wherein the C-shape is open at the leading edge thereof. Hereby, a prevalent leading edge gap is tightly controlled by means of pressurized air in order to form an air bearing. Downstream of this leading edge is the molten solder, which is contained within a very narrow gap height between the solder filler head and the mold, for example, a gap of 2 microns. As the solder fills the pits or recesses which are formed in the mold surface, air will rush out or be displaced from the pits towards the air bearing and is then expelled, while the deposited solder remains in place.

Possibly no active control over the gap may be required, although slow adjustments in the gap width may be produced by measuring the gap and may be desirable for process variations. Measurements of the gap width may be made by means of an air gauge, which is incorporated into the air bearing.

The trailing edge of the solder filler head may contain a contact seal, as is presently employed, in order to wipe away any residual solder and to also flatten the solder in the mold pits or recesses. Moreover, it is also possible to eliminate the need for a trailing edge wipe, as being unnecessary to the functioning of the present invention.

BRIEF DESCRIPTION OF THE DRAWING

Reference may now be made to the following detailed description of a preferred embodiment of the invention, taken in conjunction with the accompanying single FIGURE of drawing showing, generally diagrammatically, an air bearing gap control arrangement utilized in conjunction with injection molded solder filler heads.

DETAILED DESCRIPTION OF THE PREFERRED EMBODIMENT

Figure 1:
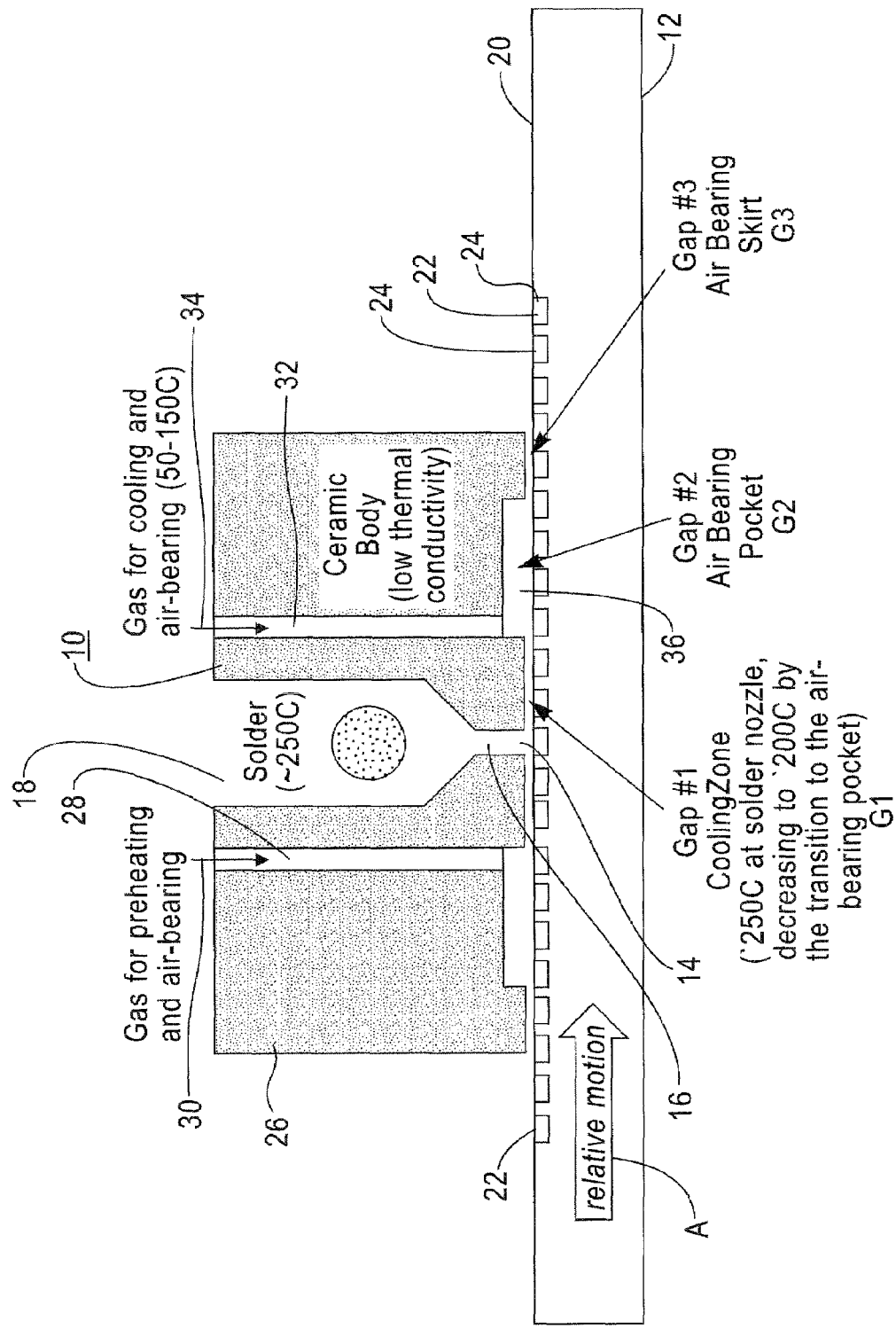

As illustrated in the drawing FIGURE, a solder filler head 10 is positioned above a mold 12, in which there is relative motion between the lower tip or solder discharge end 14 of the solder filler head 10 and the mold along the direction of arrow A. The discharge orifice (or orifices) 16 of the solder filler head 10, which maintains the solder at a temperature of about 250° C. in its reservoir 18, although variations may be utilized in the solder temperature depending upon the type of solder employed, is in the nature of a narrow gap G1 between the discharge nozzle end or outlet orifice 16 of the solder filler head 10 and the upper facing surface 20 of the mold 12, which contains the pits or recesses 22 that are to be filled with the solder 24, which is extruded from the solder filler head. The gap G1 may have a width or height of possibly approximately 2 microns, although other gap widths may be applicable, depending upon process conditions and may define a cooling zone, in which the temperature at the solder do discharge nozzle end 16 is approximately 250° C., which apparently decreases to about 200° C. by the transmition of the solder to the air bearing pocket.

As indicated, arranged above the surface 20 of the mold 12 and extending about the solder filler head 10 is a housing structure 26, preferably constituted of ceramic material body, having a low thermal conductivity, which forms a first passageway 28 extending towards the surface 20 of the mold upstream thereof, and wherein this passageway has a gas 30 introduced therein for preheating and forming an air bearing, and which gas 30 is conveyed to the gap G1 present between the discharge nozzle end 16 of the solder filler head 10 and the facing surface 20 of the mold 12.

As indicated, the ceramic housing member 26, downstream of the solder filler head 10, has a further passageway 32 extending down towards the surface 20 of the mold to a gap G2 forming an air bearing pocket, and which has a gas 34 introduced therein for cooling and forming an air bearing, at a temperature of about 50° C. to 150° C. The particular gap G2, which is formed at the bottom of that passageway, and the surface of the mold, which forms the air bearing pocket 36, is somewhat larger than a further downstream gap G3, which produces an air bearing skirt with the surface 20 of the mold 12.

Moreover, the gap G1 which is present between the discharge or nozzle end 16 of the solder filler head 10 and the surface 20 of the mold 12 can be somewhat narrower than the gap G3 forming the air bearing skirt, as long as the bearing stiffness and the localized glass latent property ensures that the gap G1 is always larger than zero and smaller than the minimum solder-escape gap. Hereby the air bearing stiffness and stability is largely defined by the geometry of gap G3 and gap G2, wherein gap G2 is slightly wider than gap G3.

The low-conductivity ceramic material of the housing structure 26 supports the precise grinding, which is required for the air bearing surfaces, and also facilitates that the cooling zone in gap G1 between the surface 20 of the mold 12 and the discharge orifice of the solder filler head provides a nearly linear temperature gradient across the cooling zone. The outlet temperature can be controlled by defining the flow rate and the incoming temperature of a nitrogen flow forming the gases 30, 34, as well as by controlling heat transfer characteristics (such as fins, etc.) of an interface between the nitrogen gases and the ceramic material surrounding the solder zone, which is formed by the solder filler head 10.

From the foregoing, it becomes readily apparent to one of skill in this particular technology that the configuration of the air bearing gap control for the injection molded solder filler head provides for a novel structure and advantageous functioning in comparison with the present technology.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but to fall within the spirit and scope of the appended claims.

What is claimed is:

1. An air bearing gap control arrangement for an injection molded solder head, wherein said arrangement comprises:
    an injection molded solder head having a reservoir containing solder in a liquefied state, at least one discharge aperture communicating with the bottom of said reservoir for extruding solder;
    a mold having a surface with a plurality of recesses in a surface facing said discharge apertures for receiving solder extruded therefrom;
    said mold being movable relative to said solder discharge nozzle, whereby said mold surface defines a first gap between said components; and
    a housing structure encompassing said injection molded solder head so as to define a passageway for the infeed of a gas for preheating a cooling zone formed by said first gap and producing an air bearing, and a second gap being formed downstream of said first gap communicating with a passageway for the infeed of a gas for cooling and producing an air bearing pocket between the mold surface and a bottom of said housing structure.

2. An arrangement as claimed in claim 1, wherein said housing structure at a downstream lower end thereof forms a third gap with said mold surface to provide an air bearing skirt during the movement between said mold and said injection molded solder head.

3. An arrangement as claimed in claim 1, wherein said at least one discharge aperture has a surrounding C-ring seal having the opening of said C-shape facing the leading edge towards said first gas infeed passage to form said air bearing.

4. An arrangement as claimed in claim 1, wherein said solder is extruded from said reservoir at a temperature of about 250° C. through said at least one discharge aperture and is cooled to about 200° C. during transmition to said air bearing pocket present in said second gap.

5. An arrangement as claimed in claim 1, wherein said gas in said passages is constituted of air or nitrogen supplied under a pressure above atmospheric.

6. An arrangement as claimed in claim 1, wherein said first gap is adjustable in width depending upon operating conditions and characteristics of the solder.

7. An arrangement as claimed in claim 1, wherein said housing structure comprises a ceramic material body possessing a low thermal conductivity.

8. A method of providing an air bearing gap control for an injection molded solder head, wherein said method comprises:
    providing an injection molded solder head having a reservoir containing solder in a liquefied state, having at least one discharge aperture communicating with the bottom of said reservoir for extruding solder;
    having a mold possessing a surface with a plurality of recesses in a surface face said discharge apertures for receiving solder extruded therefrom;
    displacing said mold being relative to said solder discharge nozzle, whereby said mold surface defines a first gap between said components; and
    have a housing structure encompass said injection molded solder head so as to define a passageway for the infeed of a gas for preheating a cooling zone formed by said first gap and producing an air bearing, and a second gap being formed downstream of said first gap communicating with a passageway for the infeed of a gas for cooling and producing an air bearing pocket between the mold surface and a bottom of said housing structure.

9. A method as claimed in claim 8, wherein said housing structure at a downstream lower end thereof forms a third gap with said mold surface providing an air bearing skirt during the movement between said mold and said injection molded solder head.

10. A method as claimed in claim 8, wherein said at least one discharge aperture has a surrounding C-ring seal having the opening of said C-shape facing the leading edge towards said first gas infeed passage to form said air bearing.

11. A method as claimed in claim 8, wherein said solder is extruded from said reservoir at a temperature of about 250° C. through said at least one discharge aperture and is cooled to about 200° C. during transmition to said air bearing pocket present in said second gap.

12. A method as claimed in claim 8, wherein said gas in said passages is constituted of air or nitrogen supplied under a pressure above atmospheric.

13. A method as claimed in claim 8, wherein said first gap is adjustable in width depending upon operating conditions and characteristics of the solder.

14. A method as claimed in claim 8, wherein said housing structure comprises a ceramic material body possessing a low thermal conductivity.

* * * * *